United States Patent [19]

Yamada

[11] Patent Number: 5,093,659
[45] Date of Patent: Mar. 3, 1992

[54] PAGING METHOD AND PAGER
[75] Inventor: Yoshinobu Yamada, Kodaira, Japan
[73] Assignee: Casio Computer Co., Ltd., Tokyo, Japan
[21] Appl. No.: 455,986
[22] Filed: Dec. 22, 1989
[30] Foreign Application Priority Data
Dec. 29, 1988 [JP] Japan .................. 63-330866
[51] Int. Cl.$^5$ ............................................. H04Q 7/00
[52] U.S. Cl. ..................... 340/825.44; 340/825.47; 340/825.53
[58] Field of Search .............. 340/825.44, 825.47, 340/311.1, 825.26, 825.27, 825.07, 825.53

[56] References Cited

U.S. PATENT DOCUMENTS

| | | | |
|---|---|---|---|
| 3,716,835 | 7/1973 | Weinberg et al. | 340/825.27 |
| 4,131,881 | 12/1978 | Robinson | 340/825.53 |
| 4,403,212 | 9/1983 | Masaki | 340/311.1 |
| 4,473,824 | 9/1984 | Claytor | 340/825.27 |
| 4,517,561 | 5/1985 | Burke et al. | 340/825.07 |
| 4,845,491 | 6/1989 | Fascenda et al. | 340/825.44 |
| 4,887,077 | 12/1989 | Irby, III et al. | 340/825.47 |
| 4,910,655 | 3/1990 | Ashkin et al. | 340/825.07 |

Primary Examiner—Donald J. Yusko
Assistant Examiner—Peter S. Weissman
Attorney, Agent, or Firm—Frishauf, Holtz, Goodman & Woodward

[57] ABSTRACT

A paging system comprises a base station and a number of pagers. The base station transmits calling-number data and message data in the form of radio signals. The message data contains selection-code data. Each pager indicates that the pager is being called, in accordance with the message data, when the calling-number data is identical to the calling-number data already stored in the pager. The pager comprises a calling-number data momory, a selection-code memory, a comparator, and an alarm device. When the calling-number data transmitted from the base station is identical to the calling-number data stored in the calling-number data memory, the comparator compares the selection-code contained in the message data, with the selection-code stored in the selection-code memory. When the comparator determines that the selection-code transmitted from the base station is identical to the selection-code stored in the selection-code memory, the alarm device is activated to indicate that the pager is being called. In this paging system, any pager can be called in accordance with the calling-number data and also the selection-code contained in the message data, either data having been transmitted from the base station.

18 Claims, 11 Drawing Sheets

PAGING METHOD AND PAGER

BACKGROUND OF THE INVENTION

1. Field of the Invention

The present invention relates to a paging method of performing individual calling and group calling, and also relates to a pager which can be called by this method.

2. Description of the Related Art

One paging method is disclosed in U.S. Pat. No. 4,403,212. In this method, a base station transmits an address-word signal including a calling code or calling number designating one of the pagers which can communicate with the base station, and then a message-word signal which is to be supplied to the pager designated by the calling number. Each pager has a memory (e.g., a ROM) storing the calling number assigned to the pager. Upon receipt of the calling number sent from the base station, the pager determines whether or not the received calling number is identical to the code stored in the memory. If the received number is identical to the stored one, the pager determines that it has been called, and generates an alarm, informing its bearer that the pager is being called. Then, the pager receives the message-word signal transmitted from the base station after the address-word signal. A display displays the message represented by the message-word signal Another known paging method can perform not only the individual calling, but also so-called group calling. In this paging method, the memory of each pager stores two calling numbers, i.e., the individual-calling number assigned to the pager, and the group-calling number assigned to the group of pagers to which the pager belongs. In order to achieve the individual calling, a caller transmits the individual-calling number assigned to the pager to which he or she wishes to call to the base station. To perform the group calling, the caller transmits the group-calling number assigned to the group of pagers to which he or she wishes to call to the base station. This conventional paging method is disadvantageous in the following respect.

The caller cannot call the selected ones of the pagers belonging to a group, by using a group-calling number. He or she must repeat individual calling in order to call only the selected pagers of the group.

This problem can be solved by dividing the pagers of each group into subgroups each consisting of less pagers. Here arises another problem. A subgroup-calling number must be assigned to each pager, in addition to the individual-calling number and the group-calling number. The memory incorporated in the pager must have a large memory capacity great enough to store these calling numbers. Every time the pager receives calling number, the pager must compare received calling number with each of the calling numbers. It must therefore be complex in structure.

Moreover, still another problem arises if each of the groups is divided into sub-groups each consisting of less pagers. Assuming that a calling number is formed of a predetermined number of bits, for example, 18 bits, the paging system could have as many as 2$^{18}$ pagers if only one calling number were assigned to each pager. If two or more calling numbers, such as an individual-calling number and a group-calling number, are assigned to each pager, the paging system can have but far less pagers. In other words, the more calling numbers assigned to each pager, the less pagers the system can have.

This is why an individual-calling number and only one group-calling number are assigned to each pager in the conventional paging method. In the conventional paging method, it is impossible for the caller to call some of the pagers of a group at the same time.

SUMMARY OF THE INVENTION

Accordingly it is an object of the present invention to provide a paging method which enables a caller to communicate with pagers the number of which is greater than that limited by the number of bits forming a calling number, and also relates to a pager of the type which can be used in the paging method.

It is another object of the present invention to provide a paging method which enables a caller to call, at the same time, selected ones of any group of pagers, and also a pager of the type which can be used in the paging method.

To attain the above objects, in a paging method designed for a paging system comprising a base station for converting calling-number data and message data into radio signals and transmitting the radio signals, and a plurality of pagers each storing calling-number data and designed to inform a reception of a message represented by the message data transmitted from the base station after the calling number (i.e. the called number) data when the stored calling-number data is identical to the calling-number data; transmitted from the base station, wherein each of said pagers comprises:

calling-number data storing means for storing the calling-number data;

selection data storing means for storing selection data;

data-comparing means for comparing a selection data contained in the message data with the selection data stored in said selection data storing means when the calling-number data transmitted from said base station is identical to the calling-number data stored in said calling-number data storing means; and alarm means for informing that the pager is being called, when said data-comparing means determines that the selection data contained in the message data is identical to the selection data stored in said selection data storing means, the pager being called in accordance with the calling-number data and the selection data contained in the message data.

Also, to attain the above objects, there is provided a pager which comprises:

calling-number data storing means for storing a calling-number data assigned to the pager;

selection data storing means for storing a selection data assigned to the pager;

first detecting means for comparing the calling-number data transmitted from said base station with the calling-number data stored in said calling-number data storing means;

second detecting means for comparing a selection data contained in the message data transmitted from said base station after the calling-number data, with the selection data stored in said selection data storing means; and alarm means for informing that the pager is being called, when said first detecting means determines that the calling-number data transmitted from said base station is identical to the calling-number data stored in said calling-number data storing means and said second deteting means determines that the selection data contained in the message data is identical to the selection data stored in said selection data storing means.

The paging method and the pager according to the present invention, both described above, enables a caller to call a plurality of pagers individually with one calling number, and also to call the pagers of a plurality of groups with one calling number.

DETAILED DESCRIPTION OF THE PREFERRED EMBODIMENTS

An embodiment of the present invention will now be described, with reference to FIG. 1 through FIG. 9.

Figure 1:
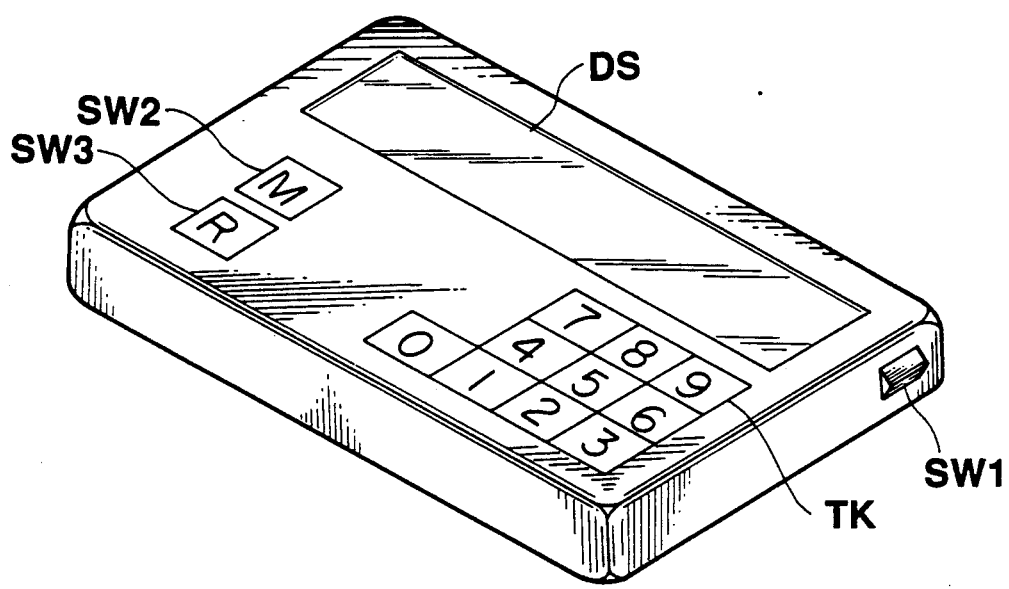
FIG. 1 is a perspective view showing the outer appearance of a pager according to a first embodiment of the present invention.

FIG. 1 is a perspective view showing a pager according to the first embodiment of the invention. As is illustrated in this figure, a main switch SW1 is mounted on one side of the pager. A display DS, a mode switch SW2, a read switch SW3, and a ten-key pad TK are arranged on the front of the pager.

The main switch SW1 is a power-supply switch. When it is on, power is supplied to the pager. When it is off, no power is supplied thereto. The mode switch SW2 is operated to alter the operation mode of the pager. The read switch SW3 causes the display DS to display the data which has been received by the pager and stored into the memory (later described) provided in the pager. The ten-key pad TK includes ten numeral keys some which are operated to input a selection code (later described) into the pager.

The internal circuit of the pager shown in FIG. 1 will be described with reference to FIG. 2. As FIG. 2 shows, the pager has an antenna 1, a receiver 2, a decoder 3, an ID-ROM 4, a CPU 5, and a memory 6.

The antenna 1 receives radio signals transmitted from a base station (later described). The radio signals are supplied to the receiver 2. The receiver 2 detects and amplifies these signals. It further decodes the radio signals into serial data comprising "0" bits and "1" bits. The receiver 2 supplies the serial data to the decoder 3. The decoder 3 decodes the serial data, detects the calling number included in the serial data, and compares the calling number with the calling number stored in the ID-ROM and assigned to the pager, thereby determining whether or not the calling numbers compared are identical. If the received calling number is identical to the calling number stored in the ID-ROM 4, the decoder 3 supplies a reception interrupt signal to the CPU 5, and converts the message data, which the antenna 1 has received after reception of the calling number, into parallel data. The parallel data is input to the CPU 5. If the calling number is not identical to the calling number stored in the ID-ROM 4, the decoder 3 supplies a reception stop signal to the receiver 2. In response to the reception stop signal, the receiver 2 stops performing its function.

The memory 6 comprises a RAM, for example, and is connected to the CPU 5, for storing the message represented by the serial data output from the decoder 3 to the CPU 5, and also selection codes (later described). The message and the selection codes can be read from the memory 6 whenever necessary.

Figure 2:
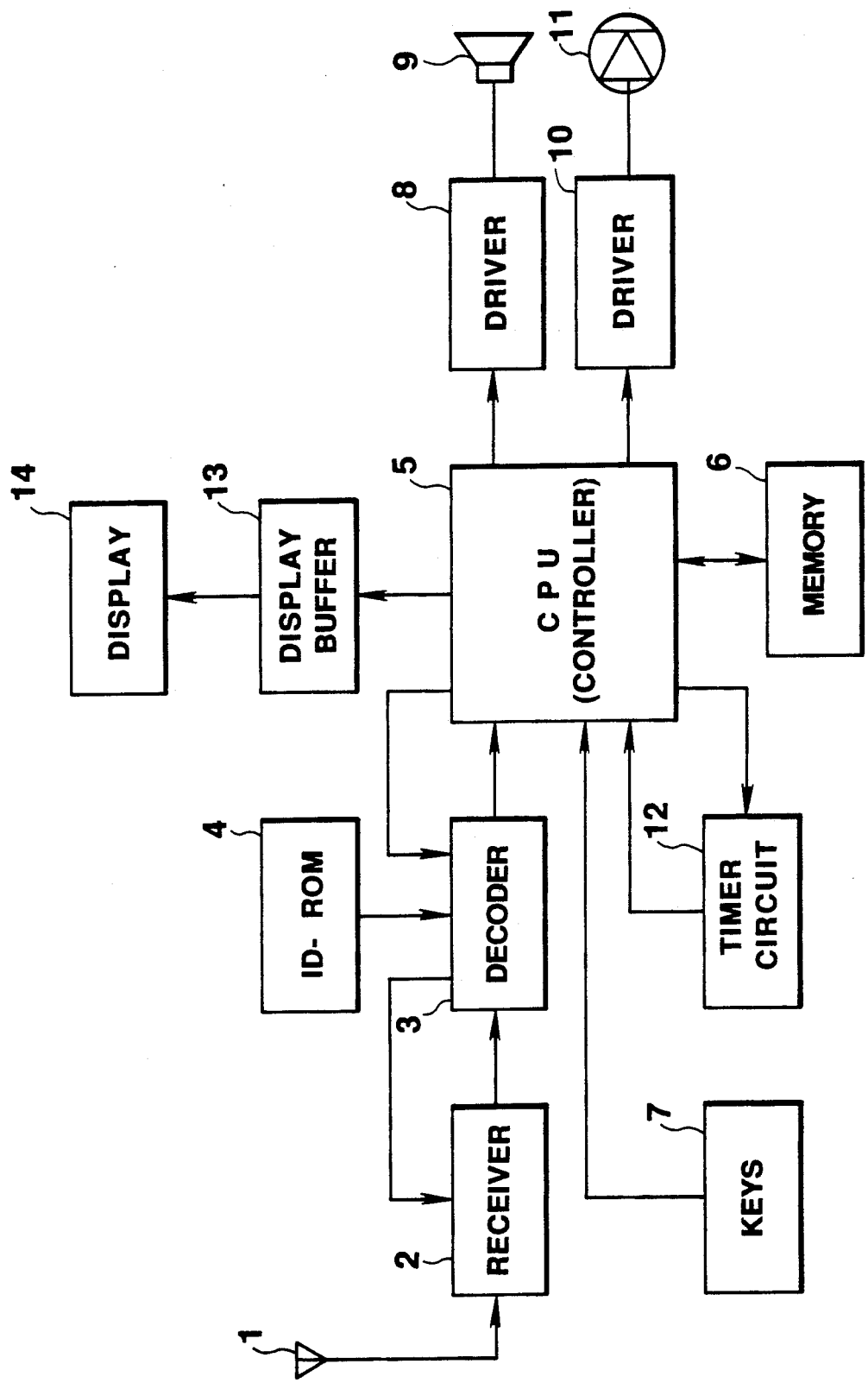
FIG. 2 is a block diagram illustrating the electric circuits incorporated in the pager shown in FIG. 1.

The key-input section 7 shown in FIG. 2 includes the switches SW1 to SW3 and the ten-key pad TK. This section 7 is connected to the CPU 5. Signals generated by operating the key-input section 7 are supplied to the CPU 5.

As is illustrated in FIG. 2, the pager further comprises a speaker driver 8 coupled to the CPU 5, a speaker 9 connected to the driver 8, an LED driver 10 connected to the CPU 5, an LED 11 connected to the driver 10, a timer circuit 12, and a display buffer 13. The display 14 shown in FIG. 2 is the display DS shown in FIG. 1.

The CPU 5 is a central processing unit which stores micro-programs and performs various operations in accordance with the reception interrupt signal supplied from the decoder 3 and the signals supplied from the key-input section 7. The user of the paper operates the ten-key pad TK, thereby inputting the selection code of the pager to the memory 6 through the CPU 5. The CPU 5 compares the selection code stored in the memory 6 with the selection code included in the message data received by the receiver 2. If the selection codes are identical, the CPU 5 causes the speaker driver 8 to drive the speaker 9, whereby the speaker 9 generates an alarm informing the user that the pager is receiving a message. At the same time, the CPU 5 causes the LED driver 10 to drive the LED 11, whereby the LED 11 emits light, thus informing the user that the pager is receiving a message.

The timer circuit 12 keeps measuring time. Its count shows the present time. When the CPU 5 receives the message data from the receiver 2 via the decoder 3, the timer circuit 12 supplies the CPU 5 with a signal representing the present time. The CPU 5 writes the time data representing the present time, i.e., the time of receipt of the message data, into the memory 6, along with the message data. The time data is displayed on the display 14 along with the message data on the display 14.

The display buffer 13 is a memory for temporarily storing the message and some other data items. When necessary, the data stored in the buffer 13 is supplied to the display 14. The display 14 is, for example, a liquid crystal display device.

Figure 3:
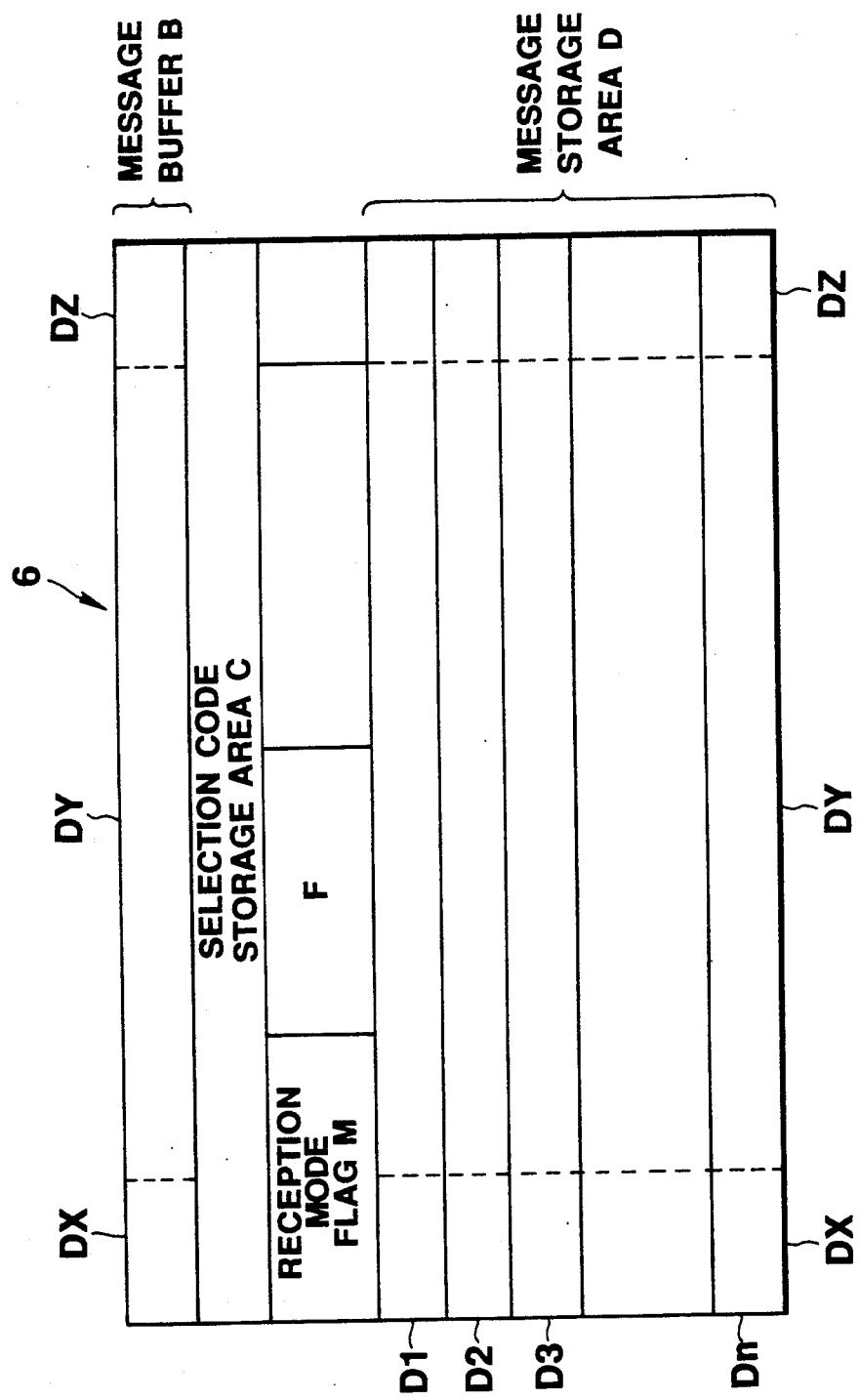
FIG. 3 is a memory map representing the items of data which are stored in the memory shown in FIG. 2.

FIG. 3 shows a memory map representing the items of data which are stored in the memory 6. As can be understood from this figure, the memory 6 comprises a message buffer B, a selection code storage area C, a reception-mode flag area M, a calling flag area F, and a message storage area D. The message storage area D includes n sub areas D1 to Dn. The message buffer B temporarily stores the received data (i.e., the message data and function data) and the data representing the time when the pager has received the message data. The selection-code storage area C is allotted for the selection code which the user has input by operating the key-input section 7. The reception-mode flag area M is set while the pager is receiving the ratio signals transmitted from the base station. The calling flag is set in area F when the CPU 5 finds received selection code identical to the selection code which the user has input into the memory 6. The sub-areas D1 to Dn of the message storage area D are allotted for the messages, the function data, and the time data items showing the times the pager has received these messages. The message buffer B and each sub-area of the message storage area D is comprised of a function-data storage area DX, a message storage area DY, and a reception-time storage area DZ. The message storage area DY includes a selection code area and a pure message area.

Figure 4:
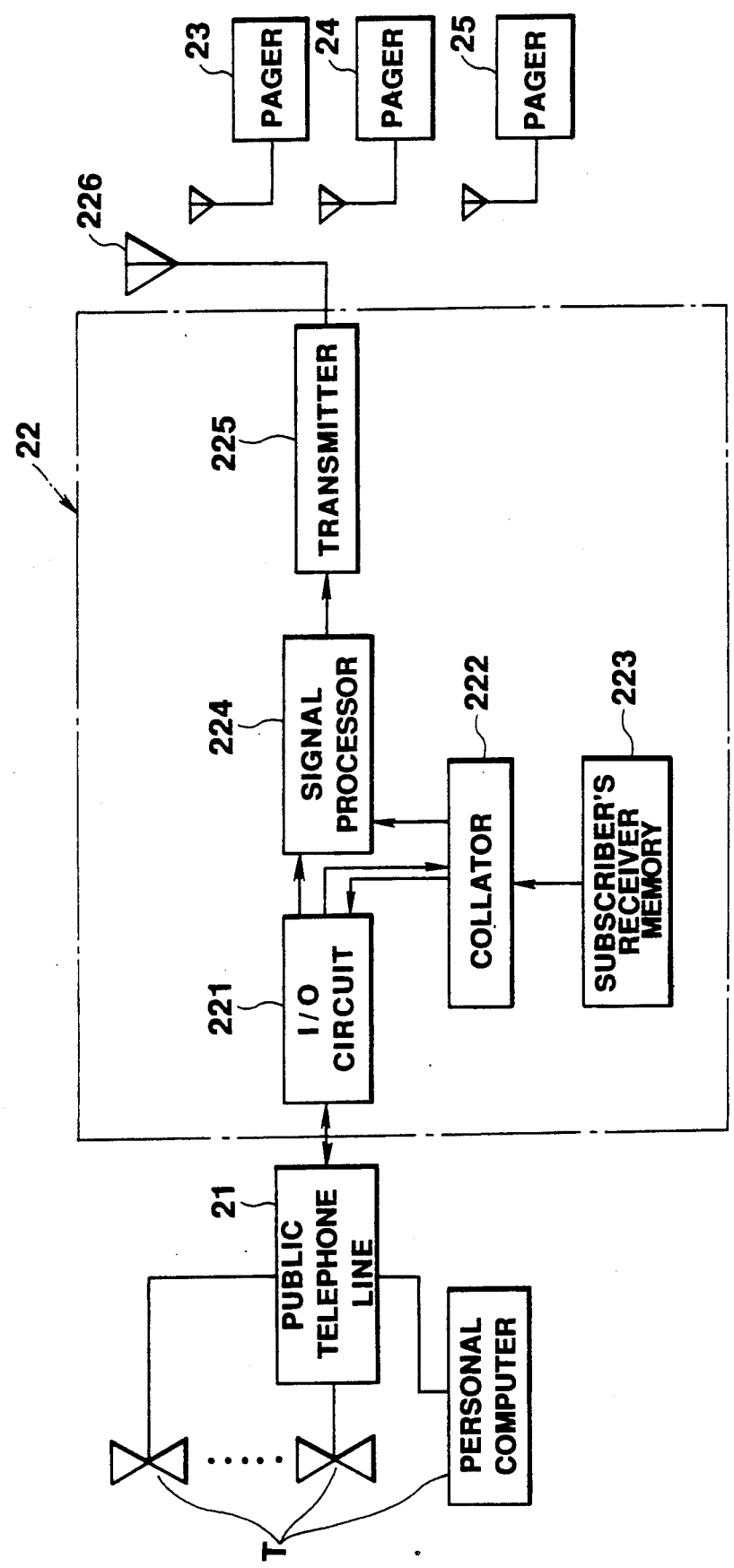
FIG. 4 is a diagram illustrating a paging system including pagers identical to the pager illustrated in FIGS. 1 and 2.
Figure 5:
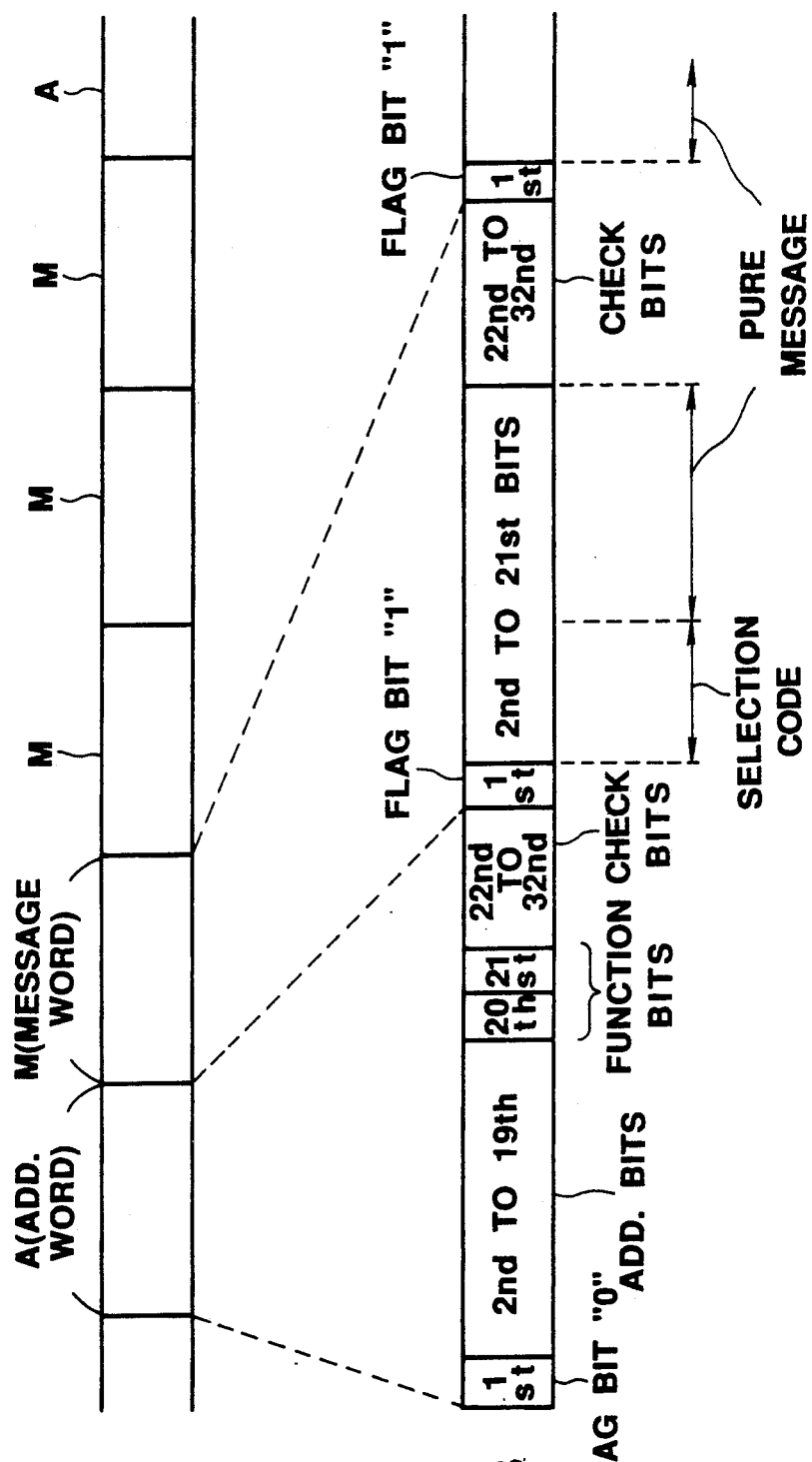
FIGS. 5A and 5B are schematic representations of the address word signal and the message word signal, respectively, both transmitted from the base station shown in FIG. 4.

FIG. 4 is a block diagram showing a paging system including pagers of the type illustrated in FIGS. 1 and 2. As is shown in FIG. 4, the paging system comprises a base station 22, a plurality of terminals T, such as telephones and computers, connected by the public telephone line 21, and a plurality of pagers 23, 24, 25, . . . which are of the same type illustrated in FIGS. 1 and 2.

A caller operates any one of the terminals T, thereby transmitting the calling number of the pager to call, the function data identifying the caller, and the message data to give the user of the pager, to the base station 22 through the public telephone line 21. In the base station 22, the calling number, the function data, and the message data are converted into radio signals. These radio signals are transmitted from the antenna 26 of the base station 22.

As FIG. 4 illustrates, the base station 22 is equipped with an input/output circuit 221, a collator circuit 222, a subscriber's receiver memory 223, a signal processor 224, and a transmitter 225. The circuit 221 comprises a modem and a response circuit. The calling number is supplied via the input/output circuit 221 to the collator circuit 222. The collator circuit 222 collates the calling number with a number of calling numbers assigned to the pagers and stored in the subscriber's receiver memory 223.

If the received calling number is found to be identical to none of the codes stored in the memory 223, the collator circuit 222 supplies a signal to the input/output circuit 21, whereby the circuit 221 outputs data, which represents a message "CALLING NUMBER NOT SUBSCRIBED", to the terminal T from which the calling number has been transmitted to the base station 22. If the received calling number is found to be identical to one of the numbers stored in the memory 223, the collator circuit 222 then checks whether the display 14 of the pager identified by the received calling number is of a numeric-display type or an alpha-numeric-display type.

If the display 14 of the pager is of the numeric-display type, the collator circuit 222 supplies a signal to the input/output circuit 221, whereby the circuit 221 outputs data, which represents a message "INPUT MESSAGE, PLEASE", to the terminal T. At the same time, the collator circuit 222 gives a command to the signal processor 224, thus instructing the processor 224 to process the received message data into numeral data. If the display 14 of the pager is of the alpha-numeric-display type, the collator circuit 222 supplies a signal to the input/output circuit 221, whereby the circuit 221 outputs data, which represents the message "INPUT MESSAGE, PLEASE", to the terminal T. At the same time, the circuit 222 gives a command to the signal processor 224, thus instructing the processor 224 to process the message data into character data.

The signal processor 224 generates a calling signal and a message signal from the received calling code, function data and message data. The transmitter 225 transmits the calling signal and the message signal, thus generated, in the form of radio signals through the antenna 26.

A paging method according to the embodiment and an operation of the pager will be explained.

In the paging method, the pagers are divided into groups. The ID-ROMs 4 of the pagers of each group store a common calling number assigned to the group, whereas the selection-code storage areas C of the memory 6 incorporated in the pagers of each group store selection codes or codes. To call one or some of the pagers belonging to one group, a calling signal representing the calling number assigned to the group, and a message signal containing the selection code assigned to said one pager or the selection codes assigned to said some pagers are transmitted from the base station 22. According to this method, individual calling, group calling and sub-group calling can be achieved.

Selection codes can be allocated to the pager in, for example, the following ways:

EXAMPLE 1

The selection code allocated to each pager is comprised of several digits which designate a group of pagers, a sub-group of pagers, a sub-sub-group of pagers, and so on, respectively. Assuming a calling number is assigned to a company, the selection code consists of three digits. The most significant digit is assigned to a department, the second most significant digit to a section of the department, and the least significant digit to a person working for the section. For example, the most significant digit is "5" for the design department, "2" for the sales department, and so forth; the second most significant digit is "4" for the accounting section, "5" for the sales section, and so forth; the least significant digit is "7" for Mr. A, "8" for Ms. B, and so forth. In this specific case, to call all persons working for any department, the caller sends the calling number of the company, the most significant digit assigned to this department, a separation code "]", and pure message data, to the base station 22. (The most significant digit and the separation code form message data, and the pure message data includes characters and numerals). To call all persons working for a section of a specific department, the caller sends the calling number, the most significant digit assigned to the department, the second most significant digit assigned to the section, a separation code "]", and pure data message, to the base station 22. (The most significant digit, the second most significant digit, and the separation code form message data.) More specifically, to call all staff of the sales section of the sales department, the caller sends a two-digit selection code "25", a separation code "]", and pure message data to the base station 22. Further, in order to call a person working for a section of a department, the caller sends the calling number, a three-digit selection code, a separation code "]", and pure message to the base station 22. The pure message is, for example, the telephone number which any person called must dial.

EXAMPLE 2

Different selection codes, e.g., "00", "01", "02", and so on, are allocated to pagers of each group, respectively. To call some of the pagers of a specific group simultaneously (e.g., the pagers to which selection codes "01", "05" and "09" are allocated), the caller sends the calling number of the group, the selection codes allocated to the selected pagers, e.g., "01", "05" and "09", a separation code "]", and pure message. (In this case, the selection codes and the separation code "]" form message data.)

EXAMPLE 3

At lest two selection codes are allocated to each pager of any group. One of the selection codes is allocated to each pager individually. The other selection codes are allocated to the sub-groups. Assume that the group consists of three pagers whose holders are Mr. A, Ms. B, and Mr. C, and that the group is divided into two sub-groups, the first sub-group consisting of the Mr. A's pager and Mr. C's pager, and the second sub-group consisting of Mr. A's pager and Ms. B's pager. Let us further assume that code "00" is assigned to the group, codes "04" and "05" are assigned to the first sub-group and the second sub-group, respectively, and codes "01", "02" and "03" are assigned to Mr. A, Ms. B and Mr. C, respectively. To call one of the three persons, e.g., Mr. A, the caller sends the selection code "01" assigned to Mr. A, to the base station 22. To call any sub-group, e.g., the first group, the called sends the selection "04" to the base station 22. To call all persons of the group, the caller sends the selection code, in this instance, "00", to the base station 22.

EXAMPLE 4

A selection code of the fourth example is used for calling pagers individually. Different selection codes are set in the pagers of any group, along with the calling code assigned to the group. To call one of the callers of any group, the caller transmits the calling number assigned to the group and also the selection code assigned to said one pager of the group, to the base station 22.

In order to set a selection code on the memory 6 in any pager, the holder of this pager operates the mode switch SW2, thereby setting the operation mode of the pager in a data-input mode. Then, the pager holder operates the ten-key pad TK, thus inputting the selection code to the CPU 5. The CPU 5 writes this code in the selection-code storage area C of the memory 6, in the same way as an ordinary CPU writes data into a memory. As a result, the selection code is set in the pager. The pager holder operates the switch SW2 again, this time altering the operation mode back to the reception mode, so that the pager can receive any ratio signal transmitted from the base station 22.

To call pagers, the caller operates the terminal T, thereby calling the base station 22 through the public telephone line 21. Then, the caller supplies an address number, i.e., the calling number stored in the ID-ROMs 4 of the pager or pagers which are to be called. The caller inputs the function data (i.e., the ID code of the caller), and the message data including the selection code designating the pager or pagers which are to be called, a separation code "]" and the pure message data.

In the base station 22, the calling code, the function data, and the message data are converted into radio signals. These radio signals are transmitted from the antenna 26 of the base station 22.

The radio signals are transmitted from the base station 22 in the specific format illustrated in FIG. 5A. This format is of the so-called POCSAG type. As is shown in FIG. 5A, the POCSAG-type format includes address words A and message words M. Each address word A is comprised of a calling number and function data. The calling number is assigned to each of pagers or each of the groups of pagers. If one message word cannot hold the whole message, the message is divided into parts, and these parts are merged into a plurality of message words M. These message words M are sequentially transmitted from the base station 22.

As can be understood from FIG. 5B, the address word A is formed of 32 bits. The first bit is a flag bit, which is "0" showing that this word is an address word. The next 18 bits, i.e., the second bit to the 19th bit, are address bits forming an address, i.e., a calling number. The 20th bit and the 21st bit are function bits forming the function data. The remaining 11 bits, i.e., the 22nd bit to the 32nd bit, are check bits. As is evident from FIG. 5B, too, the message word M is formed of 32 bits. The first bit is a flag bit, which is "1" indicating that this word is a message word. The next 20 bits, i.e., the second bit to the 21st bit, are message bits constituting a message. The remaining 11 bits, i.e., the 22nd bit to the 32nd bit, are check bits.

As has been pointed out, when the message data supplied from the terminal T to the base station 22 is relatively large, more precisely, too much to be represented by 32 bits, the message data is divided into two or more message words in the base station 22, and these message words are transmitted from the station 22, one after another, after the address word A. In this case, the selection code is formed of the second bit to the 13th bit of the first message word if the selection code includes three decimal digits, each of which is represented by 4 bits, the separation code is formed of 14th to 18th bit of the first message word, and pure message follows them, as is illustrated also in FIG. 5B.

The base station 22 transmits both the address word A and the message word M twice at a predetermined interval of, for example, 60 seconds, so as to ensure the reception of these words at any pager in case the first set of the words fail to reach the pagers. The second set of words transmitted is called "repeat call."

Each of the pagers 23 to 25 shown in FIG. 4 receives the radio signals at the antenna 1. In the pager, the receiver 2 shown in FIG. 2 decodes the radio signals. The decoded signals are supplied to the decoder 3. The decoder 3 determines whether the first flag bit is "1" or "0". If this flag bit is "0", the decoder 3 compares the calling number included in the address word A with the calling number stored in the ID-ROM 4. If the numbers compared are identical, the decoder 3 outputs a reception interrupt signal and sequentially outputs received function data and message data following the address bits to the CPU 5. In response to the reception interrupt signal, the CPU 5 starts the sequence of steps of the flow chart shown in FIG. 6.

First, in step S1, the CPU 5 set "1" in the reception-mode flag area M of the memory 6 in response to the reception interrupt signal supplied from the decoder 3. Hence, the pager is set to the reception mode. Then, in step S2, the CPU 5 fetches the function data and the message data supplied from the decoder 3, and writes the function data, the message data, and the time data showing the time of receipt of the message data in the function-data storage area DX, message storage area DY, and reception-time storage area DZ of the message buffer B provided in the memory 6, respectively.

In step S3, the CPU 5 determines whether or not the message data written in the message storage area DY includes a separation code "]". If NO, it is determined that all pagers of the group designated by the received calling number have been called, and the operation jumps to step S5. If YES, the operation goes to step S4. In step S4, the CPU 5 compares that portion of the message data which precedes the separation code "]", i.e., the selection code, with the selection code stored in the selection-code storage area C of the memory 6. This comparison of codes differs in accordance with the way of allocating the selection codes. In Example 1, wherein the selection code allocated to each pager consists of several digits which designate a group of pagers, a sub-group of pagers, a sub-sub-group of pagers, and so on, respectively, the CPU 5 first determines how many digits the received code has. Then, the CPU 5 extracts the same number of the head digits stored in the memory 6. The CPU 5 compares the received selection code with the selection code stored in the memory 6. In Example 2, the CPU 5 compares the received codes, which are set off by, for example, commas, with the codes stored in the memory 6, one with another. If any one of the received codes is identical to the code stored in the memory 6, the CPU 5 determines that the pager has been called. In case of examples 3 and 4, the CPU 5 compares the sole received selection code or each of received selection code with the code or codes stored in the memory 6.

If the received selection code is found identical to be stored one in step S4, the operation goes to step S5. In step S5, the CPU 5 determines whether the received message data is identical or not to the immediately preceding one. In other words, the CPU 5 determines whether or not the message data is a repeat call. If NOT, the operation goes to step S6. In step S6, the message data items already stored in the message storage area D (FIG. 3) are shifted from the sub-areas D1, D2, D3, ... downwardly, thereby emptying the uppermost sub-area D1 (FIG. 3). Then, the received message data is transferred from the message buffer B into this empty sub-area D1 of the message storage area D and thereby stored therein. In step S7, the display 14 (FIG. 2) displays the message data, thus stored in the message storage area D.

Thereafter, in step S8, the CPU 5 controls the speaker driver 8 and the LED driver 10, whereby the speaker 9 generate an alarm, and the LED 11 emits light, thereby informing the holder of the page that his or her pager is being called.

Figures 7A, 7B, 7C:
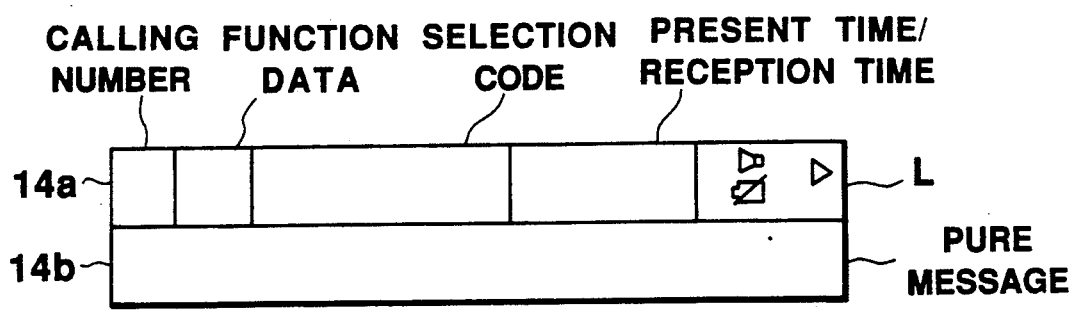
FIG. 7A illustrates a first example of the display.
FIGS. 7B and 7C show two sets of data items being displayed.

FIG. 7A illustrates a first example of the display 14, and FIGS. 7B and 7C show two sets of data items being displayed by the display 14. More specifically, FIG. 7A represents the arrangement of the display elements for displaying a selection codes allocated to a pager in the manner of Example 1 and a few other items of data, and FIGS. 7B and 7C illustrate two sets of data items, respectively, each including the selection code and each being displayed by the display 14.

Figures 8A, 8B, 8C:
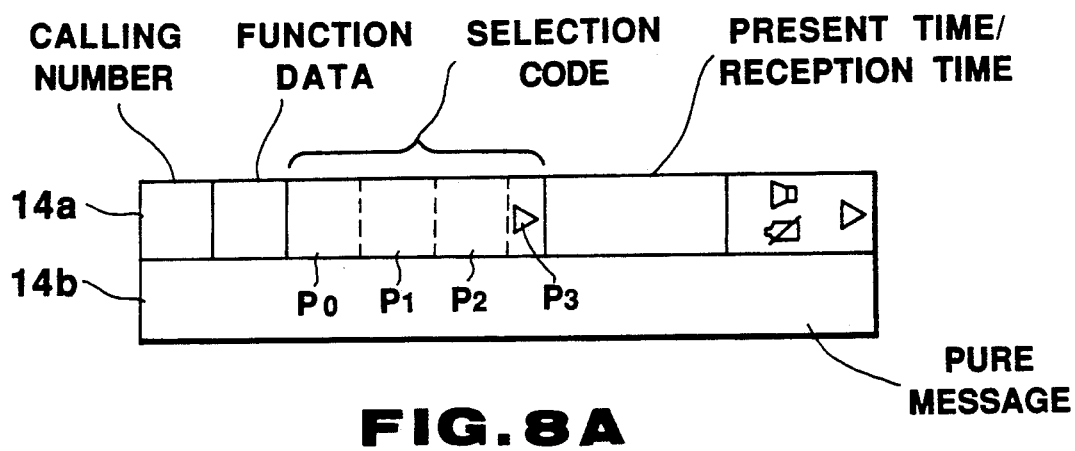
FIG. 8A illustrates a second example of the display.
FIGS. 8B and 8C show two sets of data items being displayed.

FIG. 8A illustrates a second example of the display 14, and FIGS. 8B and 8C show two sets of data items being displayed by the display 14. More specifically, FIG. 8A represents the arrangement of the display elements for displaying the selection codes allocated to pagers in the manner of Example 2 and a few other items of data, and FIGS. 8B and 8C illustrate two sets of data items, respectively each including the selection codes and each being displayed by the display 14. As is shown in FIG. 7A, the display 14 includes two display sections, i.e., an upper section 14a and a lower section 14b. The upper section 14a is comprised of five display regions. The first region is used for displaying the serial number of the received message, more precisely, the number of the sub-area of the message storage area D of the memory 6. The second region is used to display the function data, i.e., the ID data of the caller. The third region is used to display the selection code the pager has received. The fourth region is used to display a current time or the time at which the pager received the message. The fifth region L is used to display, for example, a symbol telling the pager holder that the pager has received at least one unidentified message. The lower section 14b is used for displaying the pure message.

FIG. 7B shows a set of data items being displayed by the display 14 in the first example. According to the display of FIG. 7B, it can be understood that the reception number is "9", which indicates that the displayed message is preceded by eight messages already received, the caller is that person identified by code "A", the selection code is "25" and the pure message is, in this instance, the telephone number of "03-123-4567" which the pager holder need to dial.

FIG. 7C shows displayed by the display 14 in the first format. As can be understood from FIG. 7C, the selection code received, "253" (i.e., all digits of the three-digit code) is displayed in the upper display section 14a. This code informs the pager holder that only the holder of the pager, who works for the sales section of the sales department and to who is identified by the least significant digit of "3". As is shown in FIG. 8A, the second arrangement of the display 14 is different from the first arrangement (FIG. 7A), only in two respects. First, display section P0, P1 and P2 for displaying a plurality of two-digit selection codes are provided. Second, an arrow-shaped display element is provided in the third region of the upper display section 14a, which flashes to inform the pager holder that at least one selection code other than those displayed in the display sections P0, P1 and P2 are received.

FIG. 8B shows a set of data items being displayed by the display 14 (in Example 2). As can be understood from FIG. 8B, two selection codes received, "01" and "02", are displayed in the third region of the upper display section 14a, showing the pagers identified by these codes, are being called. FIG. 8C shows a different set of data items being displayed by the display 14 (in Example 2). As can be understood from FIG. 8C, three selection codes, "01", "05", and "09" are displayed in the third region of the upper display section 14a, informing the pagers identified by these codes, are being called.

With reference to FIG. 6 again, the further operation of the pager will be explained. If the CPU 5 finds in step S4 that the received selection code is not identical to the code stored in the memory 6, the operation goes to step S9. Also, if the CPU 5 determines in step S5 that the message data received is a repeat call, the operation goes to step S9. In step S9, the CPU 5 erases the data from the buffer B of the memory 6.

After step S8 or step S9 has been carried out, the operation goes to step S10, in which the CPU 5 resets the reception-mode flag M. As a result of this, the receiving of radio signals is completed.

In the embodiment described above, each pager first detects the calling number assigned to it, and then compares the selection code or codes, which are contained in the message word it has received, with the selection code or codes stored in the memory 6. If the received code or one of the received codes is identical to the selection code or one of selection codes stored in the memory 6, the pager informs its holder that the pager is called. Each selection code can be formed freely, which is not limited to the number of bits forming the calling number. The selection code stored in the memory 6 of each pager can be written. Hence, the combination of the pagers can be altered in the units of sub-groups.

Figure 9:
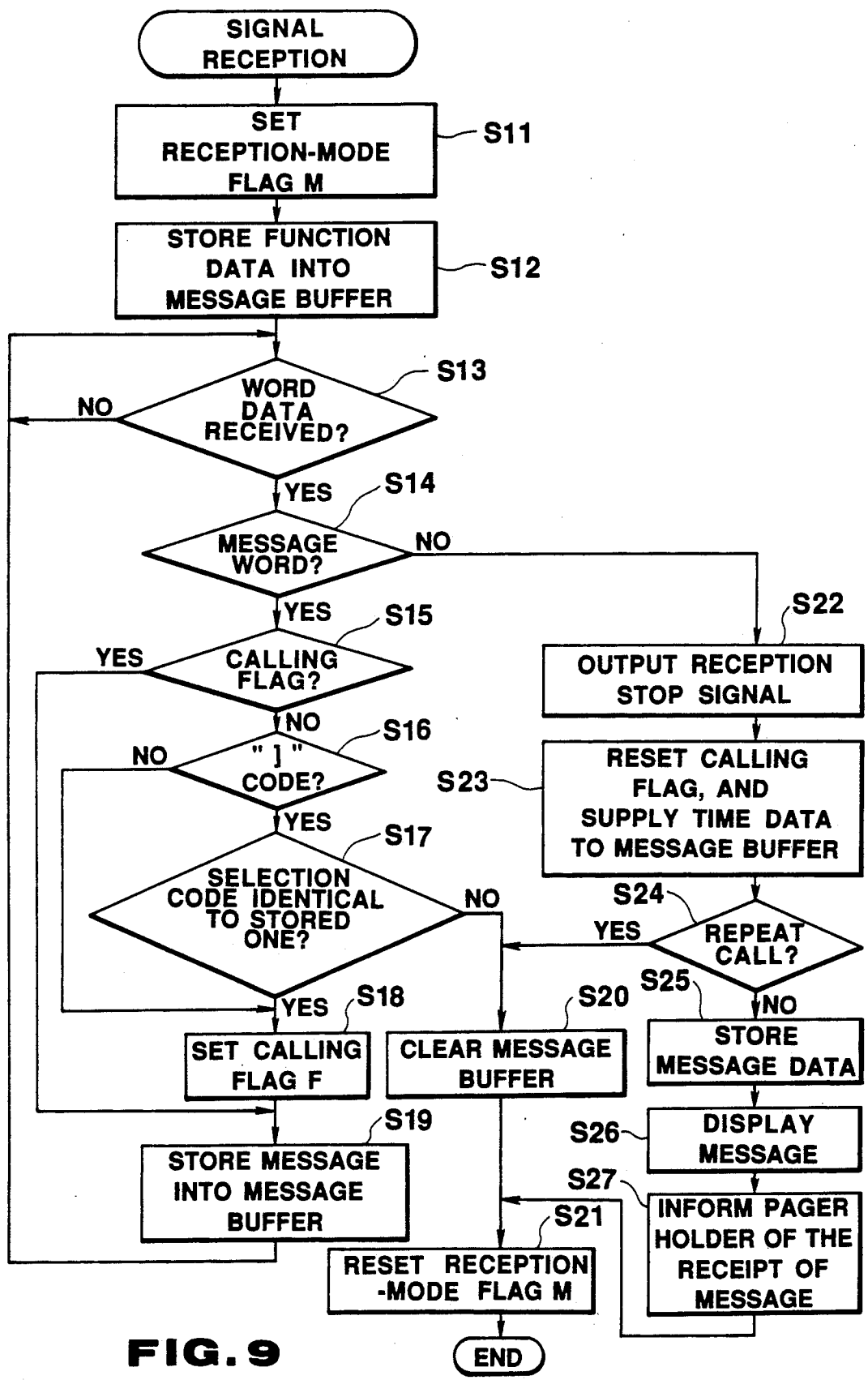
FIG. 9 is a flow chart explaining a receiving operation of each pager.

FIG. 9 is a flow chart explaining how the pager, according to another embodiment of the invention, operates to stop receiving the message data when the receive selection code is found not to be identical with the code stored in the memory 6.

The pager starts performing the operation defined by FIG. 9 when the CPU 5 determines that the received calling number is identical to the number stored in the ID-ROM 4. First, in step S11, the CPU 5 sets the reception-mode flag M. In step S12, the CPU 5 fetches the function data which is contained in the received calling number and which identifies, for example, the caller, and stores this data into the message buffer B.

Next, in step S13, the CPU 5 determines whether or not reception of the next word data is completed. If NO, the CPU 5 repeats step S13 until the reception of the next word data is completed. If YES, the operation goes to step S14. In step S14, the CPU 5 determines whether the flag bit (i.e., the first bit) of the received word is "1" or "0". If the flag bit is "1", the word is determined to be a message word. If the flag bit is "1", the word is determined to be a message word.

If the word is a message word, the operation goes to step S15, in which the CPU 5 determines whether the calling flag F has been set or not. If YES, the CPU 5 determines in step S16 whether or not the received message data contains a separation code "]". If NO. the operation jumps to step S18. If YES, the operation goes to step S17, in which the CPU 5 determines whether or not the head part of the message word, i.e., the selection code, is identical to the selection code stored in memory 6.

If YES in step 17, the operation goes to step S18, in which the calling flag F is set. Then, in step S19, the received message is stored into the message buffer B.

If YES in step S15, that is, if the calling flag F is found to be set, the message word has already been received, and the received selection code has been collated with the code stored in the memory 6. Hence, in this case, steps S16, S17 and S18 are not executed, and the operation jumps from step S15 to step S19.

If NO in step S16, that is, if no separation code "]" is found in the message word, the operation jumps to step S18. This is because no selection codes have been transmitted from the base station 22, and all pagers of the group specified by the calling number are called.

If NO in step S17, that is, the received selection code is not identical to the code stored in memory 6, the operation goes to step S20. In step S20, the CPU 5 erase the data from the message buffer B. Then in step S21, the CPU 5 resets the reception-mode flag M, whereby the reception of signals stops.

If NO in step S14, that is, if the received word is an address word, not a message word, this means that the pager has already received all the message data. In this case, the operation goes to step S22, in which the CPU 5 supplies a reception stop signal to the decoder 3. In step S23, the calling flag F is reset, and the data obtained by the timer circuit 12, which represents the present time, is transferred to the message buffer B.

Thereafter, in step S24, the CPU 5 determines whether or not the message data is identical to the message data previously received, in other words, whether this call is a repeat call. If NO, the operation goes to step S25, in which the CPU 5 transfer the data stored in the message buffer B to the message-storage area D of the memory 6. Then, in step S26, the display 14 displays the message data. In step S27, the pager informs the pager holder that the pager is called.

In the embodiment described with reference to the flow chart of FIG. 9, it is right after the collation between the received selection code and the stored selection code that the CPU 5 determines whether the reception of message data should be continued or not. If the received code is not identical to the stored one, the reception of signals is stopped, so that unnecessary operation of receiving signals is avoided.

Figure 6:
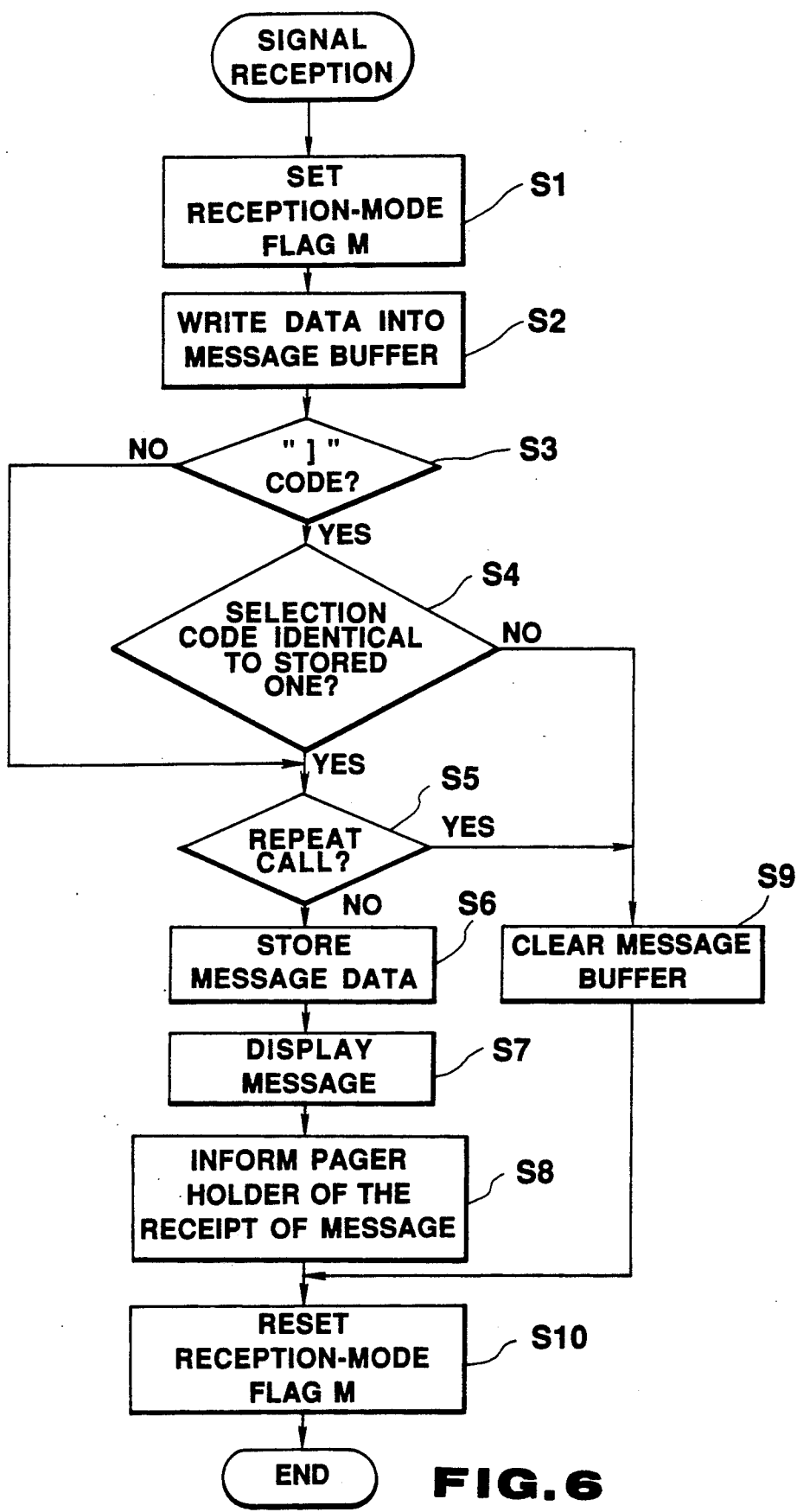
FIG. 6 is a flow chart explaining how the pager shown in FIGS. 1 to 4 receives the address word signal and the message word signal transmitted from the base station.

In the methods explained with reference to FIGS. 6 and 9, the selection code is a numerical one (i.e., a number). According to the present invention, the code is not limited to a numerical one. It can be a code formed of characters or symbols, in which case the pager must have a symbol-key pad in addition to the ten-key pad TK (FIG. 1).

Furthermore, in the methods described above, the selection code is set off from the pure message data by means of a separation code "]". Nevertheless, a code of any other type can be used as a space code. Moreover, the selection code can be the end part of the message data transmitted from the base station 22, not the head part of the message data as in the methods described above. Alternatively, the selection code can be any other part of the message data, or the end part of the first message word. Whichever part of the message data is used as the selection code, the pager can distinguish the code from the pure message, and can therefore compare the selection code with the selection code stored in the memory 6.

Figure 10:
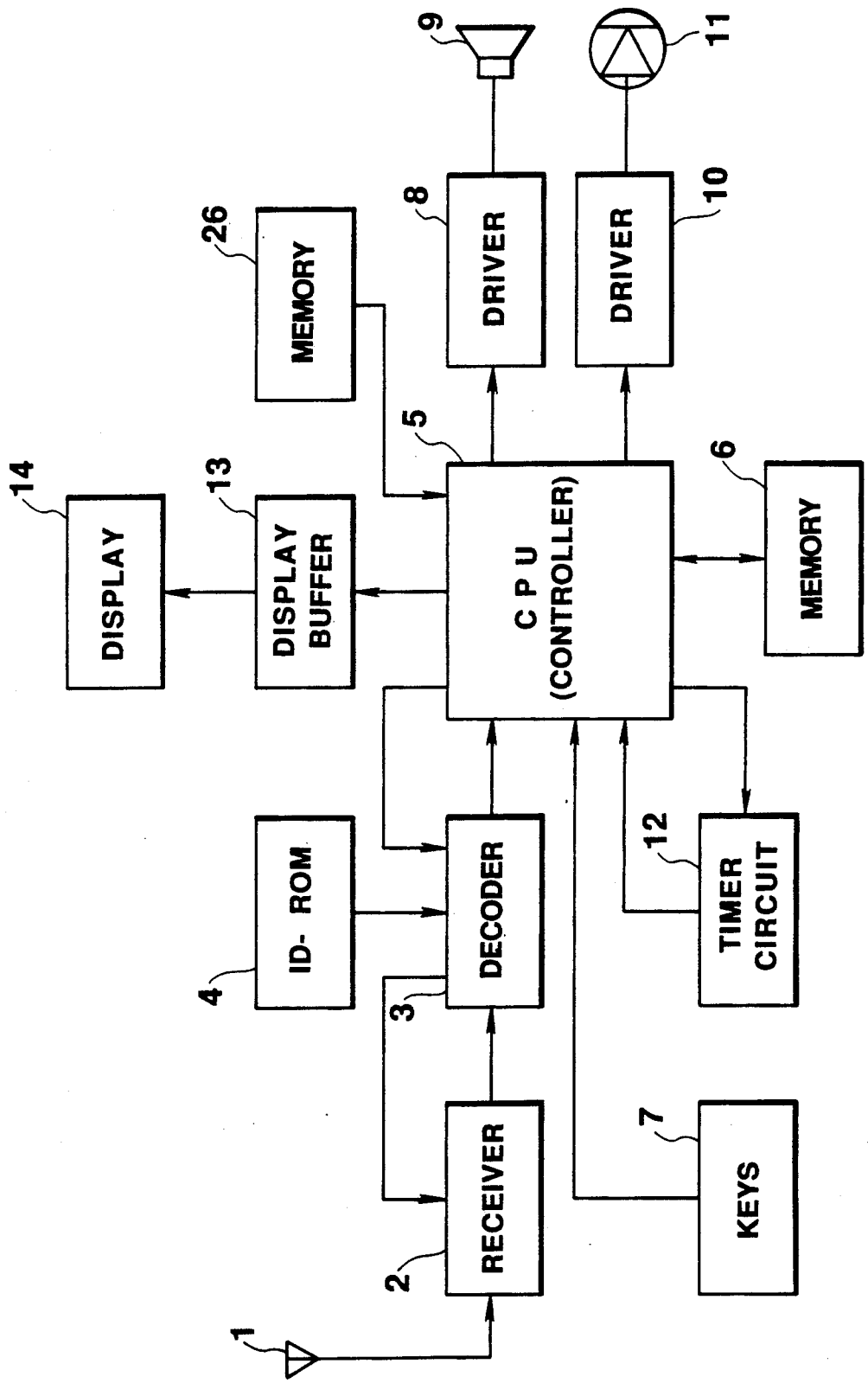
FIG. 10 is a block diagram illustrating a paper according to a second embodiment of the present invention.

FIG. 10 is a block diagram showing a pager according to the second embodiment of the invention. As can be understood from FIG. 10, this pager is different from the pager shown in FIG. 2 only in that an additional memory 26 is connected to the CPU 5. The memory 26 is used to store the selection code which the pager holder inputs by operating the key-input section 7. The memory need not be a RAM; it can be a ROM, an EPROM, or an E2PROM. If the memory 26 is a ROM, the selection code is written into the memory 26 by a ROM writer.

When the paging system shown in FIG. 4 comprises pagers identical to the pager illustrated in FIG. 10, too, a sub-group of pagers can be designated by the selection code contained in the message data which has been transmitted from the base station 22. Therefore, the calling code contained in the address word need not consists of more bits to designate a sub-group of pagers or a sub-sub group of pagers.

Figure 11:
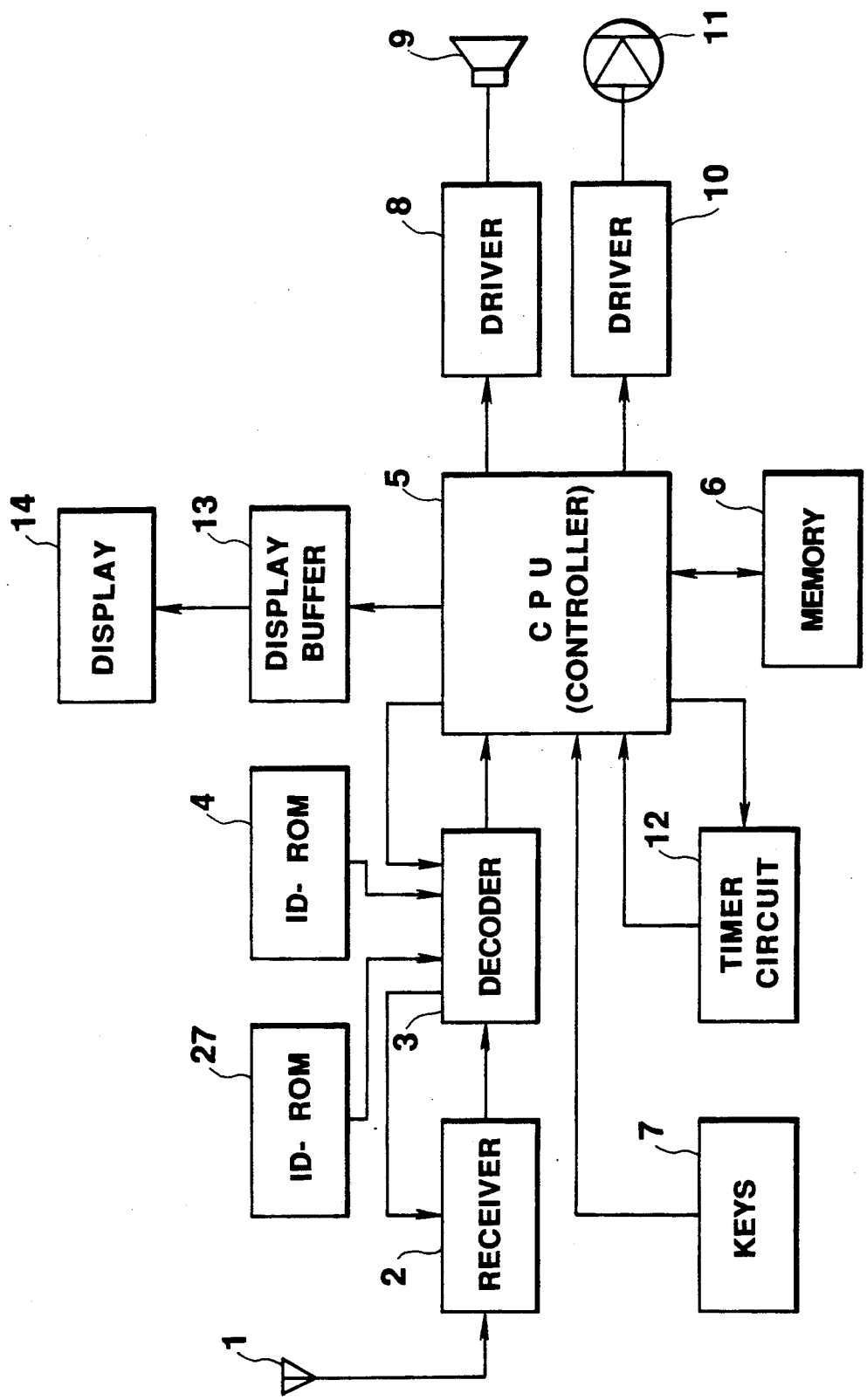
FIG. 11 is a block diagram illustrating a paper according to a third embodiment of the invention.

FIG. 11 is a block diagram showing a pager according to the third embodiment of the invention. As can be understood from FIG. 11, this pager is different from the pager shown in FIG. 2 only in that an additional ID-ROM 21 storing the calling number assigned to the pager, whereas the ID-ROM 4 stores the calling number assigned to the group of pagers, to which the pager belongs.

When the paging system shown in FIG. 4 comprises pagers identical to the pager shown in FIG. 11, to call the pagers individually the caller transmits the calling number identical to the number stored in ID-ROM 21 of the pager to be called to the base station 22. In this case, the base station 22 transmits an address word containing the calling number. To call the pagers of a sub group, the caller transmits the selection code assigned to this sub-group, and also the calling number identical to the number stored in ID-ROM 4 of pagers to which the sub-group belongs, to the base station 22. In this instance, the base station 22 transmits an address word containing the calling number and a message word containing the selecting code assigned to the subgroup. Upon receipt of either code, the decoder 3 outputs a signal to the CPU 5, causing the CPU 5 to start signal-receiving operation.

The present invention is not limited to the embodiments described above. Various changes and modification can be made within the scope of the invention.

What is claimed is:

1. In a paging system capable of communication between a caller and more than $2^n$ pagers, said system including a base station for sequentially transmitting first and second radio signals to said pagers, said first radio signal including a first address word which includes only n bits for identifying said more than $2^n$ pagers, and wherein a leading portion of said first address word includes first identification indicia for indicating that said first radio signal is an address word which includes called-pager number data, said second radio signal including a message word, and wherein a leading portion of said second radio signal includes second identification indicia for indicating that said second radio signal is a message word signal which includes message data, wherein each of said pagers comprise:
means for receiving said first and second radio signals transmitted by said base station;
a called-pager number data storage means for storing called-pager number data assigned to said pager;
selection data storage means for storing selection data assigned to said pager;
first detecting means for detecting a coincidence between said called-pager number data included in said received first address word and said called-pager number data stored in said called-pager number data storage means;
first message data storage means, which upon detection of a coincidence by said first detecting means, stores said message data included in said message word;
second detecting means for detecting whether said stored data in said first message data storage means includes predetermined function data;
third detecting means coupled to said second detecting means which upon detection of said predetermined function data by said second detecting means then determines whether said message data stored in said first message data storage means includes data identical to said selection data stored in said selection data storage means; and
display means for displaying said message data stored in said message data storing means;
when said second detecting means does not detect said predetermined function data; and
when said third detecting means detects that data identical to said selection data is present in said first message stored in said message data storage means.

2. In a paging system according to claim 1, wherein the called-number data and the message data, both transmitted from said base station, comprise a 32-bit address word and a 32-bit message word, respectively, the first bit of each word is a flag bit representing whether the word is an address word or a message word.

3. In a paging system according to claim 2, wherein said address word includes bits forming a called-code and function bits forming a code identifying said caller.

4. In a paging system according to claim 1, wherein said called-number data and the message data, both transmitted from said base station, comprise a 32-bit address word and a 32-bit message word, respectively, and said base station transmits, a plurality of message words after one address word, and wherein said selection data is contained in the first message word.

5. In a paging system according to claim 1, wherein said called-number data storing means comprises a ROM, and said selection data storing means comprises a RAM.

6. In a paging system according to claim 1, wherein said called-number data storing means and said selection data storing means comprise a ROM.

7. In a paging system according to claim 1, wherein said pager further comprises a switch pad for inputting said selection data into said selection data storing means.

8. In a paging system according to claim 1, wherein said pager further comprises timer means for measuring current time and time data storing means for storing the time data output by the timer means which represents the time when said pager receives message data.

9. A pager for sequentially receiving first and second radio signals when a caller calls said pager, said first radio signal including a first address word having a predetermined number of bits and wherein a leading portion of said first address word includes first identification indicia for indicating that said first radio signal is an address word signal which includes called-pager number data, said second radio signal including a message work which includes message data, and wherein a leading portion of said second radio signal includes second identification indicia for indicating that said second radio signal is a message word signal which includes said message data, said pager comprising:
a called-pager number data storage means for storing called-pager number data assigned to said pager;
selection data storage means for storing selection data assigned to said pager;
first detecting means for detecting a coincidence between said called-pager number data included in said received first address word and said called-pager number data stored in said called-pager number data storage means;

first message data storage means, which upon detection of a coincidence by said first detecting means, stores said message data included in said message word in said second ratio signal;

second detecting means for detecting whether said stored data in said first message data storage means includes predetermined function data;

third detecting means coupled to said second detecting means, which upon detection of said predetermined function data by said second detecting means, then determines whether said message data stored in said first message data storage means includes data identical to said selection data stored in said selection data storage means; and display means for displaying said message data stored in said first message data storage means:

when said second detecting means does not detect said predetermined function data; and when said third detecting means detects that data identical to said selection data is present in said message stored in said first message data storage means.

10. A pager according to claim 9, wherein said address word signal and said message word signal respectively include 32 bits.

11. A pager according to claim 9, wherein said address word signal includes bits representing said called-pager number data and bits for identifying said caller.

12. A pager according to claim 9, wherein said first message data storage means includes means or storing a plurality of message data included in a plurality of said message words received subsequent to said address word signal, and wherein one of said plurality of message words received after said address word, includes said predetermined function data and data identical to said selection data.

13. A pager according to claim 9, wherein said called-pager number data storage means includes a ROM (read only memory) and said selection data storage means includes a RAM (random access memory).

14. A pager according to claim 9, further comprising switching means, external of said pager, for entering said selection data into said selection data storage means.

15. A pager according to claim 9, further comprising second message data storage means for storing said message data transferred from said first message data storage means and transfer means for transferring said message data stored in said first message data storage means to said second message data storage means.

16. A pager according to claim 9, wherein said selection data storage means stores a plurality of selection data items, and wherein said third detecting means detects whether said message data stored in said first message data storage means includes a data item identical to one of said plurality of selection data items stored in said selection data storage means.

17. A pager according to claim 9, further comprising sound-generating means for generating a sound when said display means displays a message.

18. A pager according to claim 9, further comprising:
timer means for indicating the current time; and
time data storing means for storing data relating to the time at which said address word and said message word are received.

* * * * *